United States Patent [19]
Barlow et al.

[11] Patent Number: 5,284,695
[45] Date of Patent: Feb. 8, 1994

[54] METHOD OF PRODUCING HIGH-TEMPERATURE PARTS BY WAY OF LOW-TEMPERATURE SINTERING

[75] Inventors: Joel W. Barlow; Neal K. Vail, both of Austin, Tex.

[73] Assignee: Board of Regents, The University of Texas System, Austin, Tex.

[21] Appl. No.: 854,246

[22] Filed: Mar. 20, 1992

Related U.S. Application Data

[63] Continuation-in-part of Ser. No. 814,715, Dec. 30, 1991, abandoned, which is a continuation of Ser. No. 559,338, Jul. 30, 1990, Pat. No. 5,076,869, which is a continuation of Ser. No. 402,694, Sep. 5, 1989, Pat. No. 4,944,817.

[51] Int. Cl.$^5$ .................. B32B 31/00; B27N 3/00; B23K 9/00; B29C 67/00
[52] U.S. Cl. .................. 428/206; 156/62.2; 156/272.8; 219/121.85; 264/125; 428/325; 428/357
[58] Field of Search .................. 264/22, 41–43, 264/56, 60, 61, 63, 109, 125; 156/62.2, 272.8; 219/121.65, 121.66; 428/206, 241, 283, 323, 325, 357, 402, 406

[56] References Cited

U.S. PATENT DOCUMENTS

| | | | |
|---|---|---|---|
| 3,899,554 | 8/1975 | Kaiser et al. | 156/630 X |
| 4,575,330 | 3/1986 | Hull | 425/174.4 |
| 4,665,492 | 5/1987 | Masters | 364/468 |
| 4,818,454 | 4/1989 | Urquhart et al. | 264/59 |
| 4,818,562 | 4/1989 | Arcella et al. | 427/53.1 |
| 4,828,008 | 5/1989 | White et al. | 164/66.1 |
| 4,863,538 | 9/1989 | Deckard | 156/62.2 |
| 4,889,670 | 12/1989 | Gurak et al. | 264/43 X |
| 4,929,402 | 5/1990 | Hull | 264/22 |
| 4,938,816 | 7/1990 | Beaman et al. | 156/62.2 |
| 4,944,817 | 7/1990 | Bourell et al. | 156/62.2 |
| 4,961,154 | 10/1990 | Pomerantz et al. | 364/522 |
| 5,001,088 | 3/1991 | Hauptmann et al. | 264/43 |
| 5,017,317 | 5/1991 | Marcus | 264/81 |
| 5,017,753 | 5/1991 | Deckard | 219/121.63 |
| 5,031,120 | 7/1991 | Pomerantz et al. | 364/522 |
| 5,059,266 | 10/1991 | Yamane et al. | 156/64 |
| 5,076,869 | 12/1991 | Bourell et al. | 156/62.2 |

FOREIGN PATENT DOCUMENTS

| | | |
|---|---|---|
| 0221276 | 8/1986 | European Pat. Off. |
| 0283003 | 3/1988 | European Pat. Off. |
| 62-96976 | 12/1982 | Japan . |
| 9003893 | 4/1990 | PCT Int'l Appl. |
| 0431924 | 5/1990 | PCT Int'l Appl. |

OTHER PUBLICATIONS

Chemical Abstracts, vol. 115, No. 4, Jul. 29, 1991, Columbus, Ohio, US; abstract No. 34265y.
Leont'ev, "Lazernaja Poverhnostja Obrabotka Metallor 1 Splavor," (1986), pp. 120–123, (partial translation included).
Takei, et al., "Rhenum Films Preparation by Laser Melting," J. App. Phys. 51 (5) (May 1980), pp. 2903–2908.
Deckard, et al., "Solid Freedom Fabrication and Selective Powder Sintering", Presented at NAMRACIS (1987) pp. 636–640.
Weiss, et al., "A Framework for Thermal Spray Shape Deposition: The MD* System," presented at the Solid Freeform Fabrication Symposium, Aug. 1991.
Sachs, et al., "Three dimensional printing of Ceramic Shells and Cores for Metal, Casting," 39th Annual Technical Meeting: Investment Casting Institute 1991, pp. 12:1–12:13.

Primary Examiner—William A. Powell
Attorney, Agent, or Firm—Vinson & Elkins

[57] ABSTRACT

A method of producing high temperature parts by way of relatively low temperature sintering is disclosed. A powder is produced, for example by spray drying a slurry, in which particles of a high temperature material such as a ceramic are partially coated with a low temperature material such as a polymer. The powder is subjected to selective laser sintering, or another heat-based layerwise additive process, to form a green part where the ceramic particles are bound by the polymer. The green part is permeated with a cementing agent having high temperature properties when cured; the cementing agent binds the exposed ceramic surfaces in the green part. The polymer is then removed, leaving the high temperature part. Additional cementing agent, or another high temperature material, may then be added to the part after removal of the polymer.

21 Claims, 1 Drawing Sheet

METHOD OF PRODUCING HIGH-TEMPERATURE PARTS BY WAY OF LOW-TEMPERATURE SINTERING

This application is a continuation-in-part of copending application Ser. No. 814,715, filed Dec. 30, 1991, now abandoned, which is a continuation of copending application 559,338, filed Jul. 30, 1990, now U.S. Pat. No. 5,076,869, issued Dec. 31, 1991, which is a continuation of application Ser. No. 402,694 filed Sep. 5, 1989, now U.S. Pat. No. 4,944,817 issued Jul. 3, 1990.

This application is in the field of producing parts by additive processes, and is more specifically directed to the producing of parts by way of selective laser sintering.

BACKGROUND OF THE INVENTION

A significant portion of the product design cycle of many modern manufactured products has generally been consumed by the time required to build and test prototype parts. Accordingly, many manufacturers operate fast turn-around shops for the producing of prototype parts useful in the development of the manufactured product. One popular method of producing prototype parts in such shops is the subtractive machining of a block of material until the part matches the dimensions in a mechanical design. As is well known, the accuracy with which the machined prototype part matches the design can widely vary, primarily according to the skill of the machinist. In addition, the ability of subtractive processing to produce parts of complex shape is limited, and the time required for the machining of the part can be quite lengthy. As such, the product design cycle depending upon subtractive machining of prototypes is often lengthy, delaying the time-to-market of the eventual manufactured product.

Accordingly, new methods for the producing of parts, especially prototypes, have been developed in recent years to enable the rapid manufacture of complex parts directly from computer-aided-design (CAD) data bases. In particular, additive processes for building up the parts from a material have recently become popular, such processes in contrast to subtractive processes which remove material from a block to form the part. One type of such an additive process is stereolithography, as described in U.S. Pat. Nos. 4,575,330 and 4,929,402. Other processes for producing parts also selectively photopolymerize liquids, as described in U.S. Pat. Nos. 5,031,120 and 4,961,154. Additive processes by which parts are produced by jetting of droplets of solidifiable material are described in U.S. Pat. Nos. 5,059,266 and 4,665,492.

By way of further background, an additive powder-based process is described in Sachs, et al., "Three Dimensional Printing of Ceramic Shells and Cores for Metal Casting", presented at the 39th Annual Technical Meeting of the Investment Casting Institute (1991), pages 12:1 through 12:13. In the process described in this article, a part is produced in layerwise fashion from a powder. After the deposition of a layer of the powder, a binder is applied to selected locations of the layer to form a cross-section of the part, using technology similar to ink-jet printing. Additional layers of the powder are spread and similarly processed to build up the part, after which the unbound powder is removed to leave the part.

By way of further background, another additive process is described in Weiss, et al., "A Framework for Thermal Spray Shape Deposition: The MD* System", presented at the Solid Freeform Fabrication symposium (The University of Texas at Austin, August, 1991). This additive process utilizes thermal or plasma spraying of material, such as metals, through a mask to deposit a cross-section of a part. Support material (such as a lower melting point metal) is thermally sprayed through a complementary mask to fill in the layer, allowing overhangs of the primary material to be formed in subsequent layers.

A particularly successful and recently developed additive process is commonly referred to as selective laser sintering. According to the selective laser sintering process, a laser is scanned in raster fashion over a layer of fusible powder to fuse selected portions of the layer according to a cross-section of the desired part. After the fusing of the desired portions of a layer, another layer of powder is placed and similarly selectively fused, with fused portions of the later layer fusing to fused portions of the previous layer. Continued layerwise processing in this manner results in a part which can be quite complex in the three-dimensional sense. This method is described in detail in copending application Ser. No. 814,715, filed Dec. 30, 1991, now abandoned and in the above-referenced U.S. Pat. No. 5,076,869, issued Dec. 31, 1991, and U.S. Pat. No. 4,944,817 issued Jul. 30, 1990, all assigned to Board of Regents, The University of Texas System, and incorporated herein by this reference. The selective laser sintering method is also described in U.S. Pat. No. 4,863,538, issued Sep. 5, 1989, U.S. Pat. No. 5,017,753 issued May 21, 1991, and U.S. Pat. No. 4,938,816 issued Jul. 3, 1990, all also assigned to Board of Regents, The University of Texas System and incorporated herein by this reference.

By way of further background, copending applications Ser. No. 624,419 filed Dec. 7, 1990, now U.S. Pat. No. 5,156,697 issued on Oct. 20, 1992, Ser. No. 657,151 filed Feb. 19, 1991, and Ser. No. 692,172, filed Apr. 26, 1991, now U.S. Pat. No. 5,147,587 issued on Sep. 15, 1992, all also assigned to Board of Regents, The University of Texas System and incorporated herein by this reference, as well as the other referenced U.S. Patents noted hereinabove, each describe the selective laser sintering of various materials and combinations of materials such as plastics, waxes, metals, ceramics, and the like. In particular, the selective laser sintering method has been especially beneficial in the production of molds or cores useful in investment casting. For example, a part formed of a low-temperature wax by the selective laser sintering process may be used in the well-known "lost wax" method of forming an investment casting mold. In addition, the above-referenced copending applications Ser. No. 624,419, now U.S. Pat. No. 5,156,697 issued on Oct. 20, 1992 Ser. No. 657,151, now U.S. Pat. No. 5,147,587 issued on Sep. 15, 1992, and Ser. No. 692,172 now U.S. Pat. No. 5,182,170 issued on Jan. 26, 1993, each describe methods for producing parts from high temperature materials, and thus which may be useful in directly forming an investment casting mold.

In the selective laser sintering process, sufficient energy must be directed to the powder so as to cause it to fuse into the desired part cross-section. For most powders processed in this manner, including wax, plastic and metallic powders, the fusing mechanism is sintering, in which the surface tension of the irradiated powder overcomes its viscosity, such that the particles flow together and bond. As such, the temperature at which sintering occurs is substantially the melting or softening point of the powder material. For waxes and plastics, the melting point can be sufficiently low so that a low power laser (e.g., a 100 watt NdYAG laser) can sinter the material. For higher temperature materials, either higher power lasers must be used, or the temperature of the chamber in which the selective laser sintering process is carried out must be raised to near the sintering temperature. Accordingly, the production of parts of high melting point materials, such as ceramics useful as investment casting molds, is significantly more difficult than such production of lower melting point materials.

In addition, thermal gradient-related effects such as warpage and shrinkage must also be controlled in the selective laser sintering process, particularly for high temperature materials. Warpage has been observed in parts where a bottom flat surface curls up at the edges to become a curved surface, concave up. It is believed that such warpage is due to the thermal shrinkage of the sintered layer from its temperature during sintering to its post-sintering temperature, and, in some cases, the reduction in volume of a layer as it passes through the phase change from liquid to solid. The reduction in volume of a newly sintered layer, whether by phase change or by a drop in temperature, causes the top of the part to contract. The bottom of the part is thermally insulated by its immersion in unsintered powder and in previously sintered layers that have already contracted; as a result, contraction of the top layer induces stress that can curl the part. Furthermore, uneven cooling of the part during its layer-wise manufacture, for example where top layers of the part are cooled more quickly than bottom layers, has also been observed to cause warpage and curling.

Also as noted hereinabove, some materials tend to shrink in the consolidation from powder to a high density solid that occurs in the sintering process. Particularly for high temperature materials, such shrinkage causes undesirable loss of dimensional accuracy.

Because of these thermal effects, it is therefore desirable to perform the selective laser sintering at relatively low temperatures, so that the thermal gradients present in the system are controlled. However, such low temperature processing is not compatible with the desire to form high strength, high temperature parts, such as molds or cores for investment casting.

By way of further background, another method for producing parts of high temperature materials, such as high temperature ceramics and ceramic composites, utilizes a powder of polymer-coated ceramic, such as described in the above-referenced U.S. Pat. Nos. 5,076,869 and 4,944,817. As described in these Patents, after the formation of a part by flowing the polymer coating to bind particles of a high temperature material, the part is subjected to a post-process anneal, in which the polymer coating dissociates and the remaining particles of the high-temperature material sinter together and form the part. However, it has been observed that the particle sizes necessary for the selective laser sintering process can be too large to subsequently sinter in the post-process anneal, at least in a reasonable anneal time. In addition, the sintering temperature of important ceramic materials such as alumina and silica often exceeds the temperature available in conventional ovens.

It is therefore an object of the present invention to provide a method of producing parts having high melting points, by way of a low power energy beam.

It is a further object of the present invention to provide such a method in which the parts may be produced with a high degree of dimensional tolerance.

It is a further object of the present invention to provide such a method in which the ceramic, metal and metal/ceramic parts may be produced.

Other objects and advantages of the present invention will be apparent to those of ordinary skill in the art having reference to the following specification together with its drawings.

SUMMARY OF THE INVENTION

The invention may be implemented into a method for producing parts using a selective laser sintering apparatus, or another apparatus for performing an additive process by which a selected portion of a powder layer may be fused by an the application of energy. The powder consists of a high temperature material mixed with or coated by a lower melting point material, for example polymer-coated ceramic, such that surfaces of the high-temperature material are exposed after formation of a green part by the additive process. After formation of the part and removal of the unfused powder, the part is permeated with a cementing agent which binds the exposed high temperature material surfaces. The low temperature coating material is driven off, leaving a part formed of the high temperature material bound by the high temperature cement.

DETAILED DESCRIPTION OF THE PREFERRED EMBODIMENT

Figure 1:
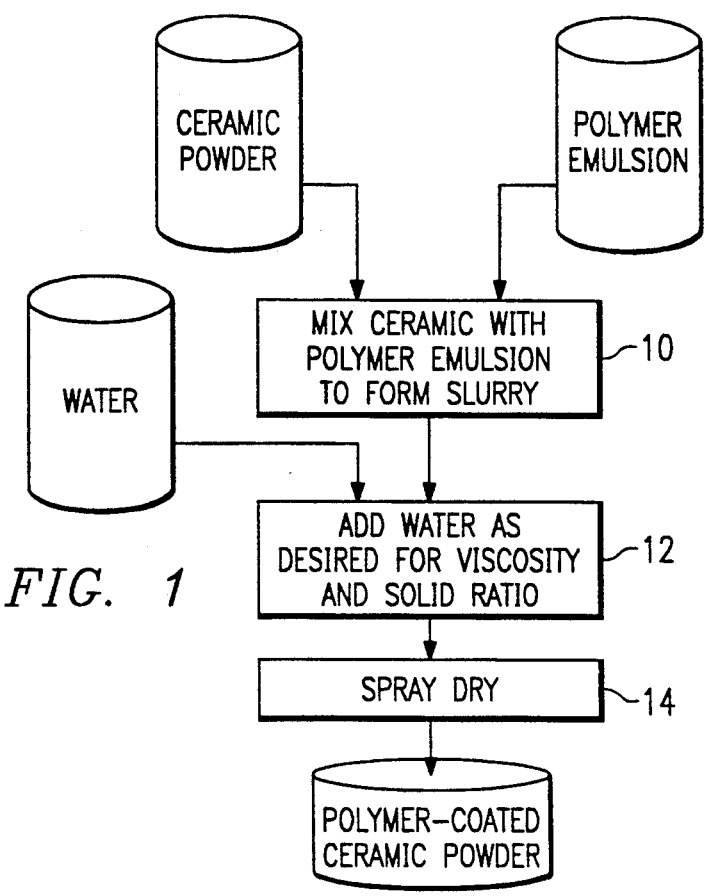
FIG. 1 is a process flow diagram of a preferred method for forming the powder used in the preferred embodiment of the invention.

The preferred embodiment of the present invention will now be described in detail relative to FIGS. 1 and 2. Referring first to FIG. 1, the preferred process for preparing the powder to be used in the present invention will now be described. The present invention is particularly suitable for the forming of parts from high temperature materials such as ceramics and metals. In its preferred embodiment, the powder producing process of FIG. 1 is intended to form a powder having particles consisting of a high temperature material such as a ceramic, coated with a low temperature material such as a polymer. While other techniques for producing a powder for use with the present invention may also be utilized, the process described hereinbelow relative to FIG. 1 is the preferred process for producing the powder.

In this exemplary embodiment of the invention, ceramic particles are to be coated with a polymer binder to form a powder by way of a spray drying process. Referring to FIG. 1, in process 10 a ceramic powder is mixed with a polymer emulsion to form a slurry. For example, a ceramic powder of particles having a size on the order of 10 to 70 $\mu$, prior to coating, is mixed (in process 10) with a polymer binder in a water-based emulsion, where the polymer binder preferably has a relatively low softening temperature, above room temperature but below 100° C. (or below the spray dryer exit temperature). Examples of such polymer binders include UCAR-430 polymer, poly(styrene-methacrylic acid, methyl methacrylate, butyl acrylate) copolymer, and other copolymers of methyl methacrylate and butyl acrylate.

Process 12 may then be performed on the slurry from process 10 to add water or such other solvent as used in the polymer emulsion, or alternatively a thickening agent, to provide the proper viscosity for the spray drying process while avoiding settling in the slurry. This process 12 is optional, depending upon the materials used; in addition, process 12 may be incorporated into the slurry producing process 10 described above.

The slurry produced by processes 10, 12 is then presented to a conventional spray dryer for spray drying into a powder in process 14 of FIG. 1. This process (and results) is further described in Vail and Barlow, "Microencapsulation of Finely Divided Ceramic Powders", *Solid Freeform Fabrication Symposium Proceedings*, (The University of Texas at Austin, August, 1991), pp. 8–15, incorporated herein by this reference. The particle size of the coated powder produced by this method can range from on the order of 50 $\mu$ to on the order of 100 $\mu$ or larger; as such, the coated powder may be readily handled in conventional selective laser sintering equipment, such as the SLS TM Model 125 and SLS TM Sinterstation 2000 TM systems manufactured and sold by DTM Corporation of Austin, Tex. As noted above, the coated powder particles formed according to this process include multiple ones of the smaller ceramic powder therewithin, as discussed in the above-referenced Vail and Barlow article.

As a result of spray drying process 14, the ceramic powder is agglomerated with the polymer binder to form particles preferably having a diameter greater than two to three times that of the original ceramic powder particles, with the amount of polymer binder being on the order of 15% by weight. Physically, each particle of the coated powder will generally include multiple individual ceramic particles, coated together by the polymer binder. This agglomeration of the particles is preferred, as it provides particle sizes suitable for selective laser sintering, particularly in the dispensation of the powder in a smooth and uniform layer over the laser target surface.

It has been observed that the polymer coating of ceramic by the process described above is incomplete, such that portions of the surfaces of the spray dried powder particles have the high temperature ceramic exposed thereat. Heretofore, this incomplete coating of the ceramic has been believed to be undesirable. According to the present invention, however, the presence of the exposed surfaces of the ceramic material (or other high temperature material) in the powder is used to advantage in the producing of parts, as will now be described relative to FIG. 2 and the preferred embodiment of the process of producing parts according to the present invention.

Figure 2:
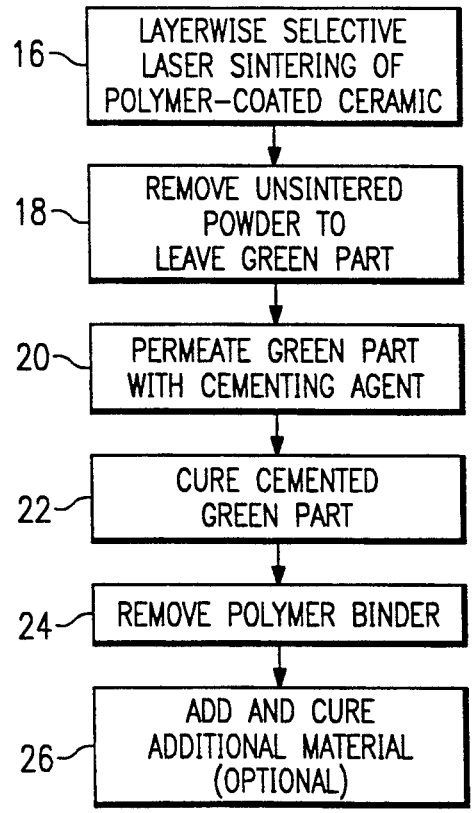
FIG. 2 is a process flow diagram of a method for producing parts according to the preferred embodiment of the invention.

Referring to FIG. 2, the first step in producing the part is the selective laser sintering of the polymer-coated ceramic powder to produce a "green" part having the desired dimensions and shape of the final part. The laser power, and thus the fusing temperature, of this process is selected to cause the polymer coating of the powder particles to sinter (or otherwise flow and bind, depending upon the material) at the selected locations of the layer. The temperature at which the polymer coating flows can be much lower than that at which the ceramic, or other high temperature powder constituent, sinters. As such, particles of the high temperature powder constituent are unaffected by the selective laser sintering process, instead bound by the lower temperature polymer coating into the part cross-sections defined by the laser scanning. As is well known, the laser scanning pattern may be driven directly by the CAD data base used in designing the part.

The selective laser sintering process 16 is preferably carried out in equipment such as either of the SLS TM Model 125 or SLS TM Sinterstation 2000 TM systems manufactured and sold by DTM Corporation of Austin, Tex. Further description of equipment for performing selective laser sintering is provided in copending U.S. applications Ser. No. 611,030, filed Nov. 9, 1990 and Ser. No. 789,358, filed Nov. 8, 1991, and copending International application PCT/US91/08351, all incorporated herein by this reference. It is contemplated that the particular settings and operating parameters of the selective laser sintering apparatus, such as the laser power, the scan rate, and the like will preferably be optimized for the particular material used, considering such factors as the thermal conductivity and heat capacity of the powder, and the softening temperature of the polymer coating. Such optimization is contemplated as being within the scope of ordinary skill in the selective laser sintering art, as adjustment of the operating parameters is generally required in the producing of parts from other materials. In addition, selective laser sintering techniques such as the layerwise cross-scanning method described in copending application Ser. No. 611,025, filed Nov. 9, 1990, now U.S. Pat. No. 5,155,324 issued on Oct. 13, 1992, in which the direction of scan varies from layer to layer, may be used in the process 16 as desired.

In the alternative to selective laser sintering, the layerwise fusing of portions of each layer of the coated powder may be accomplished by masked exposure of the powder layer to light. In this alternative process, each cross-section of the part is defined by a mask so that the portions of the layer to be fused or sintered in each layer, and thus corresponding to the part, are exposed to the light, and the portions of the layer to remain as unfused powder masked from the light. The masked exposure of the powder is repeated in layerwise fashion, similarly to selective laser sintering, to produce the three-dimensional part.

After the selective laser sintering step of process 16 has been performed to complete the green part, the unfused powder useful in supporting overhanging portions of the part is removed in process 18, leaving the green part having the desired dimensions and shape. As noted above, the powder in the green part is fused by the polymer, and not by sintering of the ceramic or other high temperature constituent therein. However, since the coating process of FIG. 1 incompletely coats the high temperature constituent, and since the green part is relatively porous, having a relative density of on the order of 30 to 50%, exposed surfaces thereof remain within the green part at this stage.

According to the present invention, a cementing agent is then applied to the green part in process 20 of FIG. 2. Due to the porosity of the green part and the exposed portions of the ceramic (or other high temperature powder constituent) therein, the cementing agent is able to permeate the part and bind the exposed ceramic surfaces to one another. The cementing agent preferably has low viscosity so that it is able to readily permeate the green part, and also preferably has high temperature characteristics when cured. Examples of such cementing agents suitable for use with ceramics are aqueous colloidal silicate suspensions, such as those manufactured and sold by Aremco Products, Inc. of Ossining, N.Y. The cementing agent is applied to the green part in process 20 by any suitable method, such as by pouring the cementing agent into and over the green part, by soaking the green part in the cementing agent, or by spraying the green part with the cementing agent. In any case, the cementing agent is applied to the point of saturation of the green part.

Upon permeating the green part with the cementing agent, the cementing agent is then dried and cured by time and temperature in process 22. The curing step may be done at various temperatures and times, depending upon the cementing agent and its suspension; for example, a room temperature drying may first be done, followed by a higher temperature (on the order of 100° C.) bake. This curing step should be done at temperatures which allow the polymer coating to continue to provide part strength and dimensional accuracy to the cemented part. After completion of the curing step, the cementing agent sufficiently binds the exposed ceramic surfaces to provide part strength and dimensional accuracy.

After cure of the cementing agent, the polymer binder is removed in process 24. This may be done by subjecting the cemented part to a bake at a higher temperature, such as on the order of 400° C. in air, until the polymer binder is removed. Alternatively, the polymer binder may also be removed in a non-oxidizing environment, if the appropriate polymer binder is used. Upon completion of polymer removal process 24, the finished part consists of only the high temperature powder constituent, bound by the cured cementing agent.

After removal of the polymer binder in process 24, the part may yet be too porous, depending upon its intended use. Additional part strength and density may then be provided by again applying (in process 26) the cementing agent to the part to filling the voids therein left behind by the removal of the polymer binder. Use of the cementing agent in process 26 will maintain the same constituents in the finished part. Alternatively, another material may be applied to the part to form a composite part, for example where a part is formed of ceramic powder constituent, filled with a metal. The additional material (cementing agent or other composite-forming material) is then cured, if necessary, to complete the part.

According to the present invention, since either the polymer or the cementing agent has held the shape of the part throughout the process, linear shrinkage and other distortion of the part dimensions is minimized. In addition, the finished part after process 24 consists solely of high temperature material, and thus is suitable for use in high temperature operations. For example, the finished part may be used as a core in an investment casting operation. As such, the advantages of selective laser sintering of low temperature materials, such as the polymer, in producing a highly accurate and complex part directly from a CAD data base, in a relatively short time, are advantageously used according to this embodiment of the invention to produce a high temperature finished part.

EXAMPLE

A specific example in which a part was produced according to the preferred embodiment of the invention will now be described in further detail, along with the measured results. This example is contemplated to be particularly useful in producing a ceramic core for use in investment casting.

In this example, the ceramic constituent of the powder was a mixture of 75 $\mu$ particles of silica with 17 $\mu$ particles of zircon. These ceramics were mixed into an emulsion of UCAR-430 copolymer, manufactured and sold by Union Carbide, to form a slurry. The slurry was spray dried into a free flowing powder having a nominal composition of 60% silica, 30% zircon, and 10% UCAR-430 (by weight).

Selective laser sintering of this powder was then performed, to produce a green part having the desired dimensions and shape, using an SLS TM Model 125 system, as noted above. In this example, the relative density of the green part was measured to be approximately 40%.

According to this example, the green part was then permeated with a cementing agent of an aqueous solution of colloidal silicate particles; in particular, the cementing agent was a solution of 50% methyl alcohol with 50% CERAMA-BIND 644 suspension, (CERAMA-BIND 644 manufactured and sold by Aremco Products, Inc. of Ossining, N.Y.). This suspension has a viscosity of on the order of 35 cps, thus providing good permeation of the green part formed as described above. It was found to be advantageous to dilute the cementing agent solution with alcohol, in order to prevent cracking during the drying and cure cycle; such cracking had been observed for parts cemented with the undiluted solution of methyl alcohol and CERAMA-BIND 644 suspension. Alternatively or in addition to alcohol dilution, the cemented green part may be dried in a humidity-controlled environment to prevent cracking.

After applying the cementing agent, the curing process in this example consists of a slow drying of the part at room temperature, for example for twelve to eighteen hours, depending upon the part shape and dimensions. The slow room temperature drying is useful to drive off the alcohol and water from the cementing agent suspension and solution. After this portion of the curing step, one such part so produced was measured to have gained approximately 0.218 grams per gram of green part.

After the slow drying step according to this example, the curing of the cementing agent was completed by a one hour bake at 100° C., followed by a one hour bake at 150° C., to fully cure the cementing agent. The gained mass of the measured part noted above was measured, after the curing step, to be 0.209 gram per gram green part, indicating that little additional mass was removed during the cure.

In this example, the polymer binder was removed from the cemented green part in a one hour bake in an air oven at 400° C. After the bake, the above noted part was again weighed to measure the amount of the polymer removed; the measured mass loss at this point was approximately 0.113 grams per gram green part, from which a polymer weight of 9.62% was calculated to have been in the green part after selective laser sintering (consistent with the 10% nominal polymer content of the powder).

According to this example, additional cementing agent of the solution of 50% methyl alcohol with 504 CERAMA-BIND 644 suspension was added to the part after polymer removal to increase its density and part strength. In the case of the measured part discussed above, such additional treatment increased its relative density to approximately 47%, providing a material strength of on the order of 150 psi. It is believed that the limiting factor for high temperature use of a part produced according to this example is the cementing agent; however, the CERAMA-BIND 644 suspension is expected to withstand temperatures up to on the order of 1650° C. The part so produced according to this example is thus suitable for use in investment casting.

In addition, the dimensional accuracy of a part produced according to this example was measured to have linear shrinkage of on the order of one to two percent. As such, the present invention is capable of producing parts having a high degree of accuracy relative to the design. In fact, this technique is superior to those which require sintering of the inorganic phase, in which linear shrinkage of on the order of 20% has been observed.

It is contemplated that other materials may be used in connection with the present invention. Examples of alternative high temperature constituents for the powder include aluminum oxide, magnesium oxide, silica, titanium oxides, and the like; each of which may be cemented by various colloidal suspensions. In addition, as noted above, it is contemplated that the present invention will be useful in producing composite parts, in which the additional material applied to the part after polymer removal differs from the cementing agent. For example, a part may be formed of cemented alumina, with aluminum metal applied thereto to infiltrate the voids left by the polymer removal, thus forming a composite aluminum/alumina part. It is contemplated that other metal matrix/ceramic composites may be similarly formed.

Further in the alternative, it is contemplated that the present invention may be used with any coated powder in which the coating of a high temperature material by a lower temperature material is incomplete, so that surfaces of the high temperature constituent are available for cementing when the part is in a form held by the bonding of the lower temperature material.

Still further in the alternative, it is further contemplated that the powder may consist of mixtures of high and low temperature material, rather than partially coated high temperature material, with the selective laser sintering or other additive process forming a green part with exposed surfaces of the high temperature material. Such mixtures may also include mixtures of metals and ceramics, such as a mixture of copper with ceramic (either coated or uncoated). In addition, it is contemplated that the present invention may be applied to a powder which is a mixture of coated and uncoated particles, for example a mixture of polymer-coated ceramic powder with uncoated ceramic powder.

Further in the alternative, the present invention may be practiced by slightly sintering, by way of selective laser sintering, a high temperature metal powder to form a green part. A cementing agent of colloidal ceramic particles may be then introduced into the slightly sintered green part, to provide a composite metal/ceramic part after curing. It is further contemplated that other techniques, such as thermal spraying, by which a green part can be produced having surfaces to which a high temperature cementing agent may bond, may also be used in connection with the present invention.

The present invention thus provides the benefits of rapid prototyping of a high temperature part directly from a CAD data base by way of selective laser sintering, where the selective laser sintering is applied to a relatively low temperature material, and is thus less vulnerable to high power and high thermal gradient effects. As such, high temperature and high part strength parts of complex shapes, and having a high degree of dimensional accuracy, may be rapidly produced according to the present invention.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method for producing a part, comprising:
   forming a porous green part comprising particles of a first material bound by a second material, the second material having a lower melting point than said first material, and wherein surfaces of said first material are exposed within said porous green part;
   applying a cementing agent to said porous green part to bind said exposed surfaces of said first material; and
   removing said second material.

2. The method of claim 1, wherein said step of forming said porous green part comprises:
   producing a powder comprising said first and second materials;
   applying a layer of said powder at a target surface;
   directing energy at selected locations of said layer corresponding to a part cross-section to fuse particles of said first material with said second material thereat;
   repeating said applying and directing steps to form a three-dimensional part in layerwise fashion; and
   removing unfused powder from said part.

3. The method of claim 2, wherein said directing step comprises:
   scanning a laser over said layer of powder.

4. The method of claim 2, wherein said directing step comprises:
   placing a mask over said layer of powder; and
   exposing said masked layer of powder to a light source.

5. The method of claim 2, wherein said step of producing a powder comprises:
   mixing particles of said first material with said second material to form a slurry;
   spray drying said slurry to form the powder.

6. The method of claim 5, wherein said particles of said first material agglomerate during said spray drying step so that particles of the powder produced by said spray drying step have surfaces at which said first material is exposed.

7. The method of claim 6, wherein said first material comprises a ceramic.

8. The method of claim 7, wherein said second material comprises a polymer in an emulsion.

9. The method of claim 6, wherein said second material comprises a polymer.

10. The method of claim 1, further comprising:
after the step of removing said second material, repeating the step of applying a cementing agent.

11. The method of claim 1, further comprising:
after the step of removing said second material, applying a third material to said part.

12. The method of claim 1, wherein said first material comprises a ceramic.

13. The method of claim 12, wherein said second material comprises a polymer.

14. A part produced by the process comprising the steps of:
forming a porous green part comprising particles of a first material bound by a second material, the second material having a lower melting point than said first material, and wherein surfaces of said first material are exposed within said porous green part;
applying a cementing agent to said porous green part to bind said exposed surfaces of said first material;
curing said cementing agent; and
removing said second material.

15. The part of claim 14, wherein said step of forming said porous green part comprises:
producing a powder comprising said first and second materials;
applying a layer of said powder at a target surface;
directing energy at selected locations of said layer corresponding to a part cross-section to fuse particles of said first material with said second material thereat;
repeating said applying and directing steps to form a three-dimensional part in layerwise fashion; and
removing unfused powder from said part.

16. The part of claim 15, wherein said directing step comprises:
scanning a laser over said layer of powder.

17. The part of claim 15, wherein said step of producing a powder comprises:
mixing particles of said first material with said second material to form a slurry; and
spray drying said slurry to form the powder;
wherein said particles of said first material agglomerate during said spray drying step so that particles of the powder produced by said spray drying step have surfaces at which said first material is exposed.

18. The part of claim 14, wherein said first material comprises a ceramic, and wherein said second material comprises a polymer.

19. The part of claim 14, further comprising:
after the step of removing said second material, repeating the step of applying a cementing agent.

20. The part of claim 14, further comprising:
after the step of removing said second material, applying a third material to said part.

21. The part of claim 15, wherein at least one of the directing steps directs energy at a first location of a first layer, and also directs energy at a plurality of locations of said first layer surrounding said first location and separated from said first location by unfused powder, so that said three-dimensional part formed by the repeating step has at least one internal structure.

* * * * *